June 7, 1966 KO-HSIN LIU 3,255,412
SYSTEM FOR MEASURING A PROPERTY OF A DIELECTRIC MATERIAL BY
PERIODICALLY APPLYING SIGNALS AT DIFFERENT FREQUENCIES
TO A CAPACITANCE PROBE
Filed Feb. 21, 1962
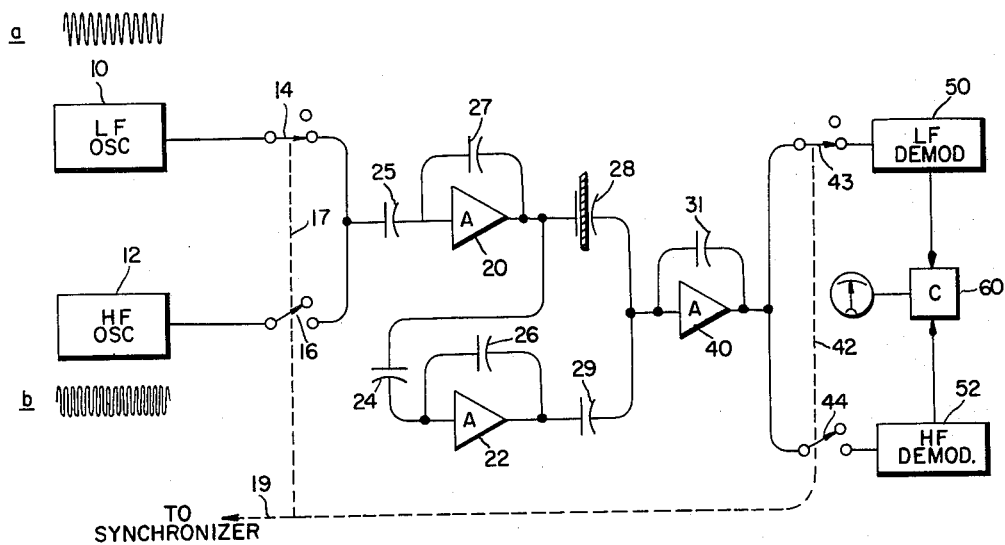
Inventor
Ko-Hsin Liu
By Anthony D. Cenrano
ATTORNEY

United States Patent Office 3,255,412
Patented June 7, 1966

3,255,412
SYSTEM FOR MEASURING A PROPERTY OF A DIELECTRIC MATERIAL BY PERIODICALLY APPLYING SIGNALS AT DIFFERENT FREQUENCIES TO A CAPACITANCE PROBE
Ko-Hsin Liu, Hilliard, Ohio, assignor to Industrial Nucleonics Corporation, a corporation of Ohio
Filed Feb. 21, 1962, Ser. No. 174,917
6 Claims. (Cl. 324—61)

This invention relates generally to measurement systems for determining a plurality of properties of a material forming a portion of the dielectric of a capacitance probe and more specifically wherein a plurality of signals of different frequencies are applied to the capacitance probe.

The present invention is an improvement on the system described in U.S. Serial No. 41,975 for Measuring System by Albert F. G. Hanken and assigned to the same asignee, now Patent No. 3,155,900. In that system the capacitance probe forms part of a bridge circuit. The probe includes as a dielectric the material to be measured in an industrial process. The bridge is simultaneously supplied with a pair of signals at separate frequencies, that is, the capacitive arms of the bridge have applied at their outer terminals balanced voltages at widely displaced frequencies. There is produced across the bridge a pair of signals at the respective frequencies but at an amplitude varying in magnitude in accordance with the unbalance of the bridge at each frequency. The unbalance signals are amplified in a wideband amplifier and then applied to a pair of filters. One filter is adapted to select the signal at the first frequency and pass it to a first detector. The output of the detector is a D.C. signal of a magnitude varying in accordance with the amplitude of the signal at the first frequency. In a similar manner the other filter is adapted to select the signal at the second frequency and pass it to a second detector. The output of the second detector is a D.C. signal of a magnitude varying in accordance with the amplitude of the signal at the second frequency. The two signals at the output of the two detectors are then applied to a computer for indicating a response relating to a qualitative or quantitative property of the material in the capacitance probe.

When it is desired to make a quantitative measurement of a property such as moisture content independent of the mass of the material, a function of the ratio of the two signals is computed, for example, the function $$\frac{S_L - S_H}{S_H} = \frac{S_L}{S_H} - 1$$

where $S_L$ and $S_H$ are the signals from the detectors for the low and high frequencies respectively. The indicated response thus constitutes an output signal which varies with both of the detected signals in such a way as to cancel out the components due to the mass variable contained in both signals.

The system of the copending Hanken application has proven to be very effective in industrial applications. However, the system does present certain inherent problems that are desired to be avoided for more efficient and reliable performance. More specifically the two signals (in the copending application) are superimposed so that the signal amplitudes, peak to peak, become very high. Consequently, when a tube is to develop a large voltage output the plate current must swing through large excursions. Also a pair of frequency selective bandpass filter networks must be used to separate the two signals. Each filter must have a flat characteristic at its main frequency and provide a large attenuation to the unwanted frequencies. Finally, the signal frequencies must be very stable to avoid possible attenuation from the filters.

The present invention is a multifrequency signal system retaining the basic principles of the aforementioned copending Hanken application. However, the signal handling techniques of my system differ radically to thereby avoid the above-noted operational problems. More specifically, in my invention the two signals are sampled alternately and the output signals of an A.C. feedback summing amplifier are synchronously fed into a pair of demodulator circuits.

It is accordingly a primary object of the present invention to provide a new and improved multifrequency measuring system.

A further object of the present invention is to provide a multifrequency measuring system having a relatively low peak to peak signal to permit the use of signals having a greater amplitude at each frequency.

Another object of the present invention is to provide a multifrequency measuring system that does not require frequency selective bandpass filters.

Still another object of the present invention is to provide a multifrequency measuring system wherein frequency variations of the signals do not affect the measuring accuracy.

Further objects and attainments of the present invention will become apparent from the following detailed description when taken in conjunction with the single figure drawing showing a block schematic diagram of a preferred embodiment of my invention.

Referring now to the drawing a pair of oscillator generators 10 and 12 are operative to produce a pair of signals represented by waveforms $a$ and $b$. These signals are at widely displaced frequencies and are referred to herein as the low and high frequency signals. The two signals are not simultaneously applied to a bridge excitation amplifier 20 but are alternately applied thereto through switches 14 and 16. These two switches may be motor driven mechanical switches or may be conventional electronic switches. They are operated by a synchronizer through means 19 and are ganged by means 17. The bridge excitation amplifier 20 amplifies the signals to the desired amplitude and feeds the signals into a phase inverting amplifier 22 to obtain exactly 180° phase reversed signals for both low and high frequency. The amplifier 20 has an input impedance 25 and a feedback impedance 27, both of which are preferably capacitors. The amplifier 22 has an input impedance 24 and a feedback impedance 26, both of which are preferably capacitors.

The output signals from the amplifiers 20 and 22 are next fed to a summing amplifier 40 through the capacitance probe 28 and capacitor 29, respectively. The capacitance probe 28 is that capacitor adapted to receive the material under measurement. The amplifier 22 acts to apply signals to the capacitor 29 that are 180° out of phase with the signals applied from the amplifier 20 to the capacitance probe 28. The amplifier 22 itself may be as described in greater detail in the copending application of Alan Norwich, Serial No. 268,268, originally filed February 21, 1962, as Serial No. 174,748, and now abandoned, for Measuring System. The amplifier 40 is an A.C. feedback amplifier having a feedback capacitor 31. The output of amplifier 40 is initially balanced by adjusting capacitors 24 or 26. That is, with no material in the probe, the relative magnitude of the two capacitors is adjusted so that the signals through capacitor 29 balance those through capacitance probe 28 so that the bridge is balanced and there is no output from the amplifier 40. When the capacitance bridge is unbalanced due to the presence of material at the capacitance probe 28, the output signal of the amplifier 40 will be directly related to a function of a property of the material, such as its moisture content. Also synchronously coupled by shaft 19 to switches 14 and 16 are another pair of switches 43 and 44, ganged by means 42. Through this arrangement when switch 14 is closed permitting the low frequency signal to pass, switch 43 is also closed permitting the modified low frequency signal to appear at a low frequency demodulator 50. Similarly, when switch 16 is closed permitting the high frequency signal to pass, switch 44 is also closed permitting the modified high frequency signal to appear at a high frequency demodulator 52. The operations of the switches are synchronized and alternate, so when switches 14 and 43 are closed, switches 16 and 44 are open and vice versa.

The outputs appearing at the low frequency demodulator 50 and the high frequency demodulator 52 are then fed to a computer 60 where the signals are compared and a readout is obtained. The outputs of the demodulators may be D.C. signals comparable to those derived by the detectors of the aforesaid Hanken application and may be similarly combined to form a function of the ratio of the two signals to provide an indication of moisture, or the signals may be combined to provide an indication of mass per unit length, or both.

Although certain and specific embodiments have been shown and described herein, many modifications may be made without departing from the true spirit and scope of the invention as set forth in the appended claims. For example, it should be noted that although the probe is called a capacitance probe, the dielectric constant of the material being measured may have an imaginary (i.e., resistive) component and the probe electrodes need not be insulated from the material being measured.

What is claimed is:

1. A system for determining the moisture content of a dielectric material comprising: a measuring probe having spaced electrodes for coupling said probe to said material, first signal generating means for generating a first signal at a first frequency, second signal generating means for enerating a second signal at a second substantially different frequency, periodically operated switching means coupled to said first and second signal generating means for coupling said first and second signals alternately to said probe, and output means coupled to said probe and responsive to both of the signals developed thereon at said first and second frequencies with said material at said probe for computing a function of said developed signals and producing an output signal which varies with both of said developed signals so as to provide an indication of said moisture content of said dielectric material independent of mass.

2. A system for determining a property of a dielectric material comprising: a measuring probe having spaced electrodes for coupling said probe to said material, first signal generating means for generating a first signal at a first frequency, second signal generating means for generating a second signal at a second substantially different frequency, periodically operated switching means coupled to said first and second signal generating means for coupling said first and second signals alternately to said probe, and output means connected to said probe for computing a function of the ratio of the signals developed thereon at said first and second frequencies with said material at said probe and producing an output signal which varies with said ratio so as to provide an indication of said property of said dielectric material independent of mass.

3. A system for quantitatively determining a property of a dielectric material comprising: a measuring probe having spaced electrodes for coupling said probe to said material, first signal generating means for generating a first alternating current signal at a first frequency, second signal generating means for generating a second alternating current signal at a second substantially different frequency, first periodically operated switching means coupled to said first and second signal generating means for coupling said first and second signals alternately to said probe, first and second signal processing circuits, second switching means coupled to said probe and synchronized with said first switching means to couple said first signal processing circuit to said probe when said first signal is applied to said probe and alternately to couple said second signal processing circuit to said probe when said second signal is applied to said probe, said first and second signal processing circuits producing respective third and fourth signals corresponding to the signals developed on said probe when the respective signal processing circuit is coupled thereto, and computer means for combining said third and fourth signals to derive an indication of said property of said dielectric material independent of mass.

4. A system for quantitatively determining a property of a dielectric material comprising: a measuring probe having spaced electrodes for coupling said probe to said material, first signal generating means for generating a first alternating current signal at a first frequency, second signal generating means for generating a second alternating current signal at a second substantially different frequency, first switching means coupled to said first and second signal signal generating means for coupling said first and second signals alternately to said probe, first and second demodulators, second switching means coupled to said probe and synchronized with said first switching means to couple said first demodulator to said probe when said first signal is applied to said probe and alternately to couple said second demodulator to said probe when said second signal is applied to said probe, said first and second demodulators producing respective third and fourth signals having D.C. components corresponding to the signals developed on said probe when the respective demodulator is coupled thereto, and compnter means for comparing said third and fourth signals to derive an indication of said property of said dielectric material.

5. A system for determining a property of a dielectric material comprising: a measuring probe having spaced electrodes for coupling said probe to said material, first signal generating means for generating a first signal at a first frequency, second signal generating means for generating a second signal at a second substantially different frequency, periodically operated switching means coupled to said first and second signal generating means for coupling said first and second signals alternately to said probe, a balancing capacitor connected in circuit with said probe, means coupled to said switching means for applying to said capacitor signals 180° out of phase with said first and second signals as coupled to said probe to balance out from the signals developed on said probe any signals developed in the absence of said material at said probe, and output means connected to said probe for computing a function of the ratio of the net signals developed thereon at said first and second frequencies with said material at said probe to provide an indication of said property of said dielectric material independent of mass.

6. A system as in claim 2 wherein said output means comprises means for balancing out from said signals developed on said probe the signal components developed thereon in the absence of said material at said probe, and computer means responsive to the unbalanced components of said developed signals for producing a read-out signal indicative of said moisture content.

References Cited by the Examiner

UNITED STATES PATENTS

| | | | |
|---|---|---|---|
| 2,459,730 | 1/1949 | Williams | 324—118 |
| 2,476,317 | 7/1949 | Nelson et al. | 324—57 |
| 2,985,826 | 5/1961 | Fluegel | 324—61 |
| 3,009,101 | 11/1961 | Locher | 324—61 |
| 3,046,537 | 7/1962 | Dow | 324—61 X |

FOREIGN PATENTS 622,470  5/1949  Great Britain.

OTHER REFERENCES

Electronics, April 1949, p. 126.

WALTER L. CARLSON, *Primary Examiner.*

J. P. O'BRIEN, A. E. RICHMOND,

*Assistant Examiners.*